(12) United States Patent
Belnap et al.

(10) Patent No.: US 8,535,400 B2
(45) Date of Patent: Sep. 17, 2013

(54) TECHNIQUES AND MATERIALS FOR THE ACCELERATED REMOVAL OF CATALYST MATERIAL FROM DIAMOND BODIES

(75) Inventors: J. Daniel Belnap, Pleasant Grove, UT (US); Anthony Griffo, The Woodlands, TX (US); Peter Thomas Cariveau, Spring, TX (US); Loel Corbett, Saratoga Springs, UT (US); Yahua Bao, Orem, UT (US); Gerald Demenna, Bronx, NY (US)

(73) Assignee: Smith International, Inc., Houston, TX (US)

( * ) Notice: Subject to any disclaimer, the term of this patent is extended or adjusted under 35 U.S.C. 154(b) by 868 days.

(21) Appl. No.: 12/581,639

(22) Filed: Oct. 19, 2009

(65) Prior Publication Data

US 2010/0095602 A1    Apr. 22, 2010

Related U.S. Application Data

(60) Provisional application No. 61/106,912, filed on Oct. 20, 2008.

(51) Int. Cl.
*B24D 11/00* (2006.01)
*B24D 99/00* (2010.01)
*C09C 1/44* (2006.01)

(52) U.S. Cl.
USPC ............... 51/307; 51/293; 51/295; 264/344; 423/446

(58) Field of Classification Search
USPC ................................. 175/327–435
See application file for complete search history.

(56) References Cited

U.S. PATENT DOCUMENTS 2,941,241 A    6/1960    Strong
2,941,248 A    6/1960    Hall
(Continued)

FOREIGN PATENT DOCUMENTS

GB    2446512 A    8/2008
JP    59123772 A    7/1984
JP    11264088 A    9/1999

OTHER PUBLICATIONS

Examination Report issued in corresponding British Patent Application No. GB0918411.0; Dated Oct. 22, 2010 (3 pages).

(Continued)

*Primary Examiner* — Kaj K Olsen
*Assistant Examiner* — Jared Wood
(74) *Attorney, Agent, or Firm* — Osha Liang LLP

(57) ABSTRACT

A method for making a thermally stable cutting element may include forming an acid mixture containing two different acid species by combining an acid solution and at least one acid-forming compound, wherein the at least one acid-forming compound is provided in solid form, and wherein the at least one acid-forming compound produces an acid that is different than the acid solution; treating at least a portion of a sintered diamond body by placing the sintered diamond body in the acid mixture, wherein the sintered diamond body comprises: a matrix phase of bonded-together diamond grains; a plurality of interstitial regions dispersed within the matrix phase; and a metal material disposed within a plurality of the interstitial regions; wherein the treating removes the metal material from at least a portion of the plurality of interstitial regions; and removing the sintered diamond body from the acid mixture after a predetermined length of time, wherein at least a portion of the diamond body removed from the acid mixture is substantially free of the metal material and is a thermally stable diamond body.

23 Claims, 8 Drawing Sheets

(56) References Cited

U.S. PATENT DOCUMENTS

| | | | |
|---|---|---|---|
| 2,947,611 A | 8/1960 | Bundy | |
| 3,609,818 A | 10/1971 | Wentorf, Jr. | |
| 3,767,371 A | 10/1973 | Wentorf, Jr. et al. | |
| 4,104,344 A | 8/1978 | Pope et al. | |
| 4,224,380 A | 9/1980 | Bovenkerk et al. | |
| 4,288,248 A | 9/1981 | Bovenkerk et al. | |
| 4,289,503 A | 9/1981 | Corrigan | |
| 4,525,178 A | 6/1985 | Hall | |
| 4,673,414 A | 6/1987 | Lavens et al. | |
| 4,694,918 A | 9/1987 | Hall | |
| 4,882,128 A | 11/1989 | Hukvari et al. | |
| 4,933,529 A | 6/1990 | Saville | |
| 4,954,139 A | 9/1990 | Cerutti | |
| 5,369,034 A | 11/1994 | Hargett et al. | |
| 5,370,195 A | 12/1994 | Keshavan et al. | |
| 6,440,224 B1 * | 8/2002 | Wei et al. | 134/3 |
| 6,744,024 B1 | 6/2004 | Hayes et al. | |
| 7,845,438 B1 * | 12/2010 | Vail et al. | 175/434 |
| 2008/0185189 A1 * | 8/2008 | Griffo et al. | 175/433 |
| 2008/0223623 A1 | 9/2008 | Keshavan et al. | |
| 2009/0139150 A1 | 6/2009 | Ras | |
| 2009/0152018 A1 | 6/2009 | Sani | |

OTHER PUBLICATIONS

Combined Search and Examination Report under Sections 17 and 18(3) issued by the United Kingdom Intellectual Property Office on Mar. 11, 2010 in related Application No. GB0918411.0.

* cited by examiner

TECHNIQUES AND MATERIALS FOR THE ACCELERATED REMOVAL OF CATALYST MATERIAL FROM DIAMOND BODIES

CROSS-REFERENCE OF RELATED APPLICATIONS

This application, pursuant to 35 U.S.C. §119, claims the benefit of U.S. Patent Application No. 61/106,912, filed on Oct. 20, 2008, which is herein incorporated by reference in its entirety.

BACKGROUND OF THE INVENTION

1. Field of Invention

Embodiments disclosed herein relate generally to polycrystalline diamond constructions and cutting structures comprising the same and, more particularly, to methods and materials used for improving the thermal stability of polycrystalline diamond constructions and the polycrystalline diamond constructions resulting therefrom.

2. Background Art

Polycrystalline diamond compact ("PDC") cutters have been used in industrial applications including subterranean drilling and metal machining for many years. In a typical application, a compact of polycrystalline diamond (PCD) (or other superhard material) is bonded to a substrate material, which is typically a sintered metal-carbide to form a cutting structure. PCD comprises a polycrystalline mass of bonded-together diamond grains or crystals that form an integral, tough, high-strength mass or lattice. The resulting PCD structure produces enhanced properties of wear resistance and hardness, making PCD materials extremely useful in aggressive wear and cutting applications where high levels of wear resistance and hardness are desired.

PCD may be formed by subjecting a volume of diamond grains to certain high-pressure/high-temperature (HPHT) conditions in the presence of a sintering aid or binder. Conventionally, the sintering aid or binder is provided in the form of a solvent metal catalyst material, such as one or more element from Group VIII of the Periodic table. The solvent metal catalyst may be added and mixed with the diamond grains prior to HPHT processing and/or may be provided during the HPHT process by infiltration from a substrate comprising the solvent metal catalyst as one of its constituent materials.

A conventional PDC cutter may be formed by placing a cemented carbide substrate into a HPHT container. A mixture of diamond grains or diamond grains and catalyst binder is placed atop the substrate in the container and the container is loaded into a HPHT device that is configured and operated to subject the container and its contents to a desired HPHT condition. In doing so, the solvent metal catalyst material in the substrate melts and infiltrates into the diamond grain volume to promote intercrystalline bonding therebetween, thereby forming a sintered diamond body that is bonded to the substrate. The substrate often comprises a metal-carbide composite material, such as tungsten carbide. The deposited diamond body may be provided in the form of and referred to as a "diamond layer", a "diamond table", or an "abrasive layer." The solvent metal catalyst material in such conventional PCD is disposed within interstitial regions that exist between bonded-together diamond crystals. Conventional PCD includes 85 to 95 percent by volume diamond and a balance binder or catalyst materials.

As noted above, PDCs are useful for forming cutting elements, e.g., PDC cutters, used in applications calling for high degrees of wear and abrasion resistance, such as drilling subterranean formations. A significant factor in determining the longevity of PDC cutters is the generation of heat at the cutter contact point, specifically at the exposed part of the PCD layer caused by friction between the PCD and the work material being engaged. This heat causes thermal damage to the PCD in the form of cracks (due to differences in thermal expansion coefficients), which lead to spalling of the PCD body or layer, and/or delamination between the PCD body and substrate, and/or back conversion of the diamond to graphite in the PCD body causing rapid abrasive wear. As a result, the thermal operating range of conventional PDC cutters is typically less than about 750° C.

Conventional PCD is stable at temperatures of up to about 700 to 750° C., after which observed increases in temperature may result in permanent damage to and structural failure of PCD. This deterioration in PCD is due to the significant difference in the coefficient of thermal expansion of the binder or catalyst material, e.g., as compared to diamond. Upon heating of PCD during use, the catalyst material and the diamond lattice expands at different rates, which may cause cracks to form in the diamond lattice structure and result in deterioration of the PCD. Damage is also due to the catalyzed formation of graphite at diamond-diamond necks at high temperatures, leading to loss of microstructural integrity and strength loss.

Attempts to address these issues have involved removing the catalyst or binder material from the diamond body after the PCD has been formed. Strong acid solutions have been used in some instances to remove or "leach" the catalyst or binder material from the diamond lattice structure. This approach has been practiced on the entire diamond body, where the catalyst material has been removed form the entire diamond body, or has been practiced on only part of or a region of the diamond body. Examples of "leaching" processes may be found, for example, in U.S. Pat. Nos. 4,288,248 and 4,104,344. In these instances, an acid solution, typically nitric acid or combinations of several acids (such as nitric and hydrofluoric acid) may be used to treat the diamond table, removing at least a portion of the catalyst or binder material PCD. By leaching out the catalyst material from the entire diamond body, thermally stable polycrystalline (TSP) diamond is formed. In certain embodiments, only a select portion or region of a diamond composite is leached, in order to gain thermal stability without losing impact resistance. As used herein, the term TSP is understood to include both of the above (i.e., partially and completely leached) compounds.

While conventional leaching processes with nitric/hydrofluoric acid mixtures are somewhat successful in removing the catalyst or binder material from the PCD, they tend to be time consuming, e.g., using mixtures of acids may easily take many weeks in order to leach out the catalyst or binder material. Further, the use and handling of acid solutions such as hydrofluoric acid presents potential safety, health, and environmental dangers. Still further, the use of such conventional leaching techniques presents certain limitations in the degree of catalyst and binder material, as well as other unwanted non-diamond materials, that may be removed from the PCD.

It is, therefore, desired that a technique and or materials be developed for the purpose of enhancing the process of removing unwanted catalyst or binder materials from the PCD. If is further desired that such technique and/or materials be engineered to also remove other unwanted non-diamond materials present in the PCD that may either contribute to undesired PCD performance properties and/or that may operate to impair subsequent processing of the PCD body after leaching.

SUMMARY OF INVENTION

In one aspect, embodiments disclosed herein relate to a method for making a thermally stable cutting element that includes forming an acid mixture containing two different acid species by combining an acid solution and at least one acid-forming compound, wherein the at least one acid-forming compound is provided in solid form, and wherein the at least one acid-forming compound produces an acid that is different than the acid solution; treating at least a portion of a sintered diamond body by placing the sintered diamond body in the acid mixture, wherein the sintered diamond body comprises: a matrix phase of bonded-together diamond grains; a plurality of interstitial regions dispersed within the matrix phase; and a metal material disposed within a plurality of the interstitial regions; wherein the treating removes the metal material from at least a portion of the plurality of interstitial regions; and removing the sintered diamond body from the acid mixture after a predetermined length of time, wherein at least a portion of the diamond body removed from the acid mixture is substantially free of the metal material and is a thermally stable diamond body.

In another aspect, embodiments disclosed herein relate to a method of making a thermally stable diamond construction that includes treating a sintered diamond body, wherein the sintered diamond body comprises: a matrix phase of bonded together diamond grains; a plurality of interstitial regions dispersed within the matrix; and a catalyst material within the plurality of interstitial regions; wherein the treating step comprises: placing the sintered diamond body in a leaching agent; and elevating the temperature of the sintered diamond body and the leaching agent to a desired leaching temperature for a predetermined amount of time; wherein after the predetermined amount of time the sintered diamond body is a thermally stable diamond body and substantially free of the catalyst material; reducing the temperature of the thermally stable diamond body and leaching agent in a controlled manner after the predetermined amount of time has passed; and cleaning the thermally stable diamond body to remove any residual non-diamond materials remaining therein.

In yet another aspect, embodiments disclosed herein relate to a method for making a thermally stable cutting element that includes treating at least a portion of a sintered diamond body comprising: placing a sintered diamond body in an acid mixture of $HNO_3$ at a concentration of 2.5 to 10 mol/liter and HF at a concentration of 4 to 10 mol/liter, the sintered diamond body having: a matrix phase of bonded-together diamond grains; a plurality of interstitial regions dispersed within the matrix phase; and a metal material disposed within a plurality of the interstitial regions; wherein the treating removes metal material from at least a portion of the plurality of interstitial regions; and removing the sintered diamond body from the acid mixture after a predetermined length of time, wherein the at least a portion of the diamond body removed from the acid mixture is substantially free of the metal material and is a thermally stable diamond body.

In yet another aspect, embodiments disclosed herein relate to a polycrystalline diamond construction that includes a diamond body having a material microstructure comprising a matrix phase of bonded together diamond crystals formed at high pressure/high temperature conditions in the presence of a catalyst material, the diamond body having a surface and including interstitial regions disposed between the diamond crystals, wherein the interstitial regions within the diamond body are substantially free of the catalyst material, wherein the diamond body comprises: a first region comprising an infiltrant material disposed within the interstitial regions and that is positioned remote from the surface; and a second region comprising interstitial regions that are substantially free of the infiltrant material and that extends into the body a depth from the surface, wherein the depth is substantially uniform within the thermally stable diamond body at the center of the thermally stable diamond body compared to a position along a circumferential edge of the thermally stable diamond body.

Other aspects and advantages of the invention will be apparent from the following description and the appended claims.

DETAILED DESCRIPTION

Figure 1A:
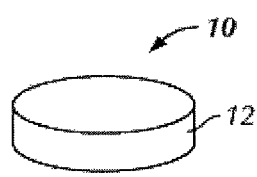
FIGS. 1A and 1B are perspective view of example PCD constructions.

In one aspect, embodiments disclosed herein relate to PCD constructions and cutting elements that have been rendered thermally stable using methods and materials that are specifically engineered for both reducing the amount of time required to leach a PCD body or cutter, and for removing other non-diamond materials from the PCD body wherein such removal may operate to further improve the thermal stability of the leached PCD body and/or may operate to facilitate subsequent processing of the leached PCD body.

More specifically, embodiments disclosed herein involve accelerating techniques and/or the use of new materials used in conjunction with the treatment process of removing undesired materials (such as a catalyst, binder, and other non-diamond materials) used to form PCD or that are created during the process of removing the catalyst or binder material. The accelerating techniques that may be used in conjunction with leaching processing include elevated pressures, elevated temperatures, and/or ultrasonic energy, and/or controlled processing conditions and/or specifically sequenced process steps.

PCD bodies may be formed in a conventional manner, such as by HPHT sintering of diamond grains in the presence of a suitable catalyst or binder material as described above to achieve intercrystalline bonding between the diamond grains or crystals. "Sintering" typically involves an HPHT process, examples of which may be found in U.S. Pat. Nos. 4,694,918; 5,370,195; and 4,525,178, each of which are hereby incorporated by reference. Briefly, to form a sintered PCD body an unsintered mass or volume of diamond grains is placed within a metal enclosure of a reaction cell of a HPHT apparatus. A suitable HPHT apparatus for this process is described in U.S. Pat. Nos. 2,947,611; 2,941,241; 2,941,248; 3,609,818; 3,767,371; 4,289,503; 4,673,414; and 4,954,139, each of which are incorporated herein by reference. A metal solvent catalyst material, such as cobalt or other Group VIII material may be included with the unsintered mass of crystalline particles to promote intercrystalline diamond-to-diamond bonding. The catalyst material may be provided in the form of powder and mixed with the diamond grains, or may be infiltrated into the diamond grains during HPHT sintering. Typical HPHT processing is carried out at elevated pressures of about 55-60 kbar, and at an elevated temperature of about 1400° C. Those of ordinary skill will appreciate that a variety of temperatures and pressures may be used, and the scope of the present invention is not limited to specifically referenced temperatures and pressures.

Diamond grains useful for forming a polycrystalline diamond body may include any type of diamond particle, including natural or synthetic diamond powders having a wide range of grain sizes. For example, such diamond powders may have an average grain size in the range from submicrometer in size to 100 micrometers, and from 1 to 80 micrometers in other embodiments. Further, one skilled in the art would appreciate that the diamond powder may include grains having a mono- or multi-modal distribution.

The diamond powder may be combined with a desired catalyst material, and the reaction cell is then placed under processing conditions sufficient to cause the intercrystalline bonding between the diamond particles. It should be noted that if too much additional non-diamond material is present in the powdered mass of crystalline particles, appreciable intercrystalline bonding is prevented during the sintering process. Such a sintered material where appreciable intercrystalline bonding has not occurred is not within the definition of PCD. Following such formation of intercrystalline bonding, a PCD body may be formed that has, in one embodiment, at least about 80 percent by volume diamond, with the remaining balance of the interstitial regions between the diamond grains occupied by the catalyst material. In other embodiments, the PCD body may comprise at least 85 percent by volume diamond, and in another embodiment at least 90 percent by volume diamond. However, one skilled in the art would appreciate that other diamond densities may be used in alternative embodiments. Thus, PCD bodies being treated or leached in accordance with the present disclosure include what is frequently referred to in the art as "high diamond density" PCD.

The PCD body formed during the HPHT process may or may not include a substrate attached thereto. For example, the diamond volume may be placed next to a suitable substrate material that comprises a catalyst or binder material that will melt and infiltrate into the diamond volume during HPHT processing. The substrate may be provided in a powder, green, or sintered state, and may be selected from those substrates conventionally used to form PCD, that include carbides, nitrides, carbonitrides, ceramics, metallic materials, cermet materials, and combinations thereof. It is to be understood that PCD bodies used herein may or may not be formed using a substrate.

In an example embodiment, the polycrystalline diamond body is formed using solvent catalyst material provided as an infiltrant from a substrate, for example, a WC—Co substrate, during the HPHT process. In such embodiment, it may be desirable to remove the resulting PCD body from the substrate prior to leaching to enable the agents to have unimpaired access to all surfaces of the PCD body.

Further, one skilled in the art would appreciate that the same techniques used with PCD may be applied to polycrystalline cubic boron nitride (PCBN). Similar to PCD, PCBN may be formed by sintering boron nitride particles (typically CBN) via a HPHT process, similar to those for PCD, to sinter "green" or unsintered grains or particles to create intercrystalline bonding between the particles. CBN refers to an internal crystal structure of boron atoms and nitrogen atoms in which the equivalent lattice points are at the corner of each cell. Boron nitride particles typically have a diameter of approximately one micron and appear as a white powder. Boron nitride, when initially formed, has a generally graphite-like, hexagonal plate structure. When compressed at high pressures in presence of a suitable solvent catalyst, CBN particles will be formed with a hardness second only to diamond, and a stability in air at temperatures of up to 1400° C.

According to one embodiment of the present disclosure, PCBN may include a content of boron nitride of at least 50% by volume; at least 70% by volume in another embodiment; at least 85% by volume in yet another embodiment. In another embodiment, the cubic boron nitride content may range from 50 to 80 percent by volume, and from 80 to 99.9 percent by volume in yet another embodiment. The residual content of the polycrystalline cubic boron nitride composite may include at least one of Al, Si, and mixtures thereof, carbides, nitrides, carbonitrides and borides of Group IVa, Va, and VIa transition metals of the periodic table. Mixtures and solid solutions of Al, Si, carbides, nitrides, carbonitrides and borides of Group IVa, Va, and VIa transition metals of the periodic table may also be included.

Figure 1B:
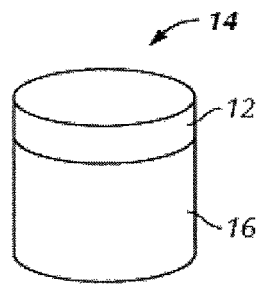

FIGS. 1A and 1B illustrate different PCD constructions that may be subjected to the leaching techniques and treatments disclosed herein. FIG. 1A illustrates a PCD construction 10 comprising a generally cylindrical diamond body 12. The diamond body has a material microstructure as noted above, comprising a first matrix phase of bonded-together diamond crystals with a second phase comprising a plurality or interstitial regions dispersed within the first matrix phase. The catalyst or binder material used for forming the PCD body forms the second phase of the body and is disposed within the interstitial regions. FIG. 1B illustrates a PCD construction 14 similar to that of FIG. 1A, except that the diamond body 12 is attached to a substrate 16. In an example embodiment, the substrate 16 is attached to the diamond body 12 during the HPHT process when the substrate is provided and present during the HPHT process as the source of the catalyst or binder material.

In various embodiments, a formed PCD body having a catalyst material in the interstitial spaces between bonded diamond grains is subjected to a leaching process in conjunction with at least one accelerating technique, whereby the catalyst material is removed from the PCD body. As used herein, the term "removed" refers to the reduced presence of the catalyst material in the PCD body that was used to initially sinter the PCD body, and is understood to mean that a substantial portion of the catalyst material no longer resides in the PCD body. However, one skilled in the art would appreciate that trace amounts of the catalyst material may still remain in the microstructure of the PCD body within the interstitial regions and/or adhered to the surface of the diamond grains.

The quantity of the catalyst material remaining in the PCD material microstructure after the PCD body has been subjected to a leaching treatment may vary, for example, on factors such as the composition of the PCD body, e.g., the diamond volume content and/or the diamond grain size, and the treatment conditions, e.g., the leaching agents that are used and/or the treatment time. Further, one skilled in the art would appreciate that it may be desired in certain applications to allow a small amount of the catalyst material to stay in the PCD body. In a particular embodiment, the PCD body may include up to about 1 to 2 percent by weight of the catalyst material. However, one skilled in the art would appreciate that the amount of residual catalyst present in a leached PCD body may depend on such factors as the diamond density of the material, the diamond grain size, and/or the diamond body thickness. Residual solvent catalysts are in many instances trapped as inclusions within the microstructure, within regions of neck growth between diamond crystals As described above, a conventional leaching process involves the exposure of an object to be leached with a leaching agent, such as described in U.S. Pat. No. 4,224,380, which is herein incorporated by reference in its entirety. In select embodiments, the leaching agent may be a weak acid, a strong acid, or mixtures of different acids. In other embodiments, the leaching agent may be a caustic material such as NaOH or KOH. Suitable acids may include, for example, nitric acid, hydrofluoric acid, hydrochloric acid, sulfuric acid, phosphoric acid, or perchloric acid, or combinations of these acids. In addition, caustic materials, such as sodium hydroxide and potassium hydroxide, have been used by the carbide industry to digest metallic elements from carbide composites. In addition, other acidic and basic leaching agents may be used as desired. Those having ordinary skill in the art will appreciate that the molarity of the leaching agent may be adjusted depending on the time desired to leach, concerns about hazards, handling issues, and the like.

While conventional leaching techniques may require many weeks for sufficient removal of catalyst material from a PCD body to occur, in accordance with the present disclosure, accelerating techniques may be applied to the leaching process to decrease the amount of treatment time required to reach the same or an improved level of catalyst removal.

In an example embodiment, the results obtained from leaching a PCD body may be improved upon by increasing the strength of the leaching agent beyond that possible using conventional leaching agents, e.g., provided in the form of acid solutions. As noted above, the conventional leaching agents that are used are acids, or a combination of two or more acids, such as nitric acid ($HNO_3$) and hydrofluoric acid (HF). An issue that exists with using such leaching agent formed from the combination of $HNO_3$ and HF is the dilution effect that is known to result from the combination. A typical $HNO_3$ solution comprises about 70 percent acid and the remainder water. A typical HF solution comprises only about 47 percent acid, and the remainder water, due to the unique handling and safety issues inherent with HF. Thus, upon combining these acid solutions the water content of the HF acts to effectively dilute the active molecular species of the $HNO_3$, thereby reducing the oxidation potential and leaching capability of the leaching mixture.

Thus, in an example embodiment, the strength and leaching effectiveness of the leaching agent may be improved upon by eliminating this dilution effect. This is done by, instead of using a first acid solution and combining it with a second acid solution, using a solid chemical compound capable of forming a desired acid and combining this with an acid solution. Alternatively, a leaching agent may be formed by using two solid chemical compounds and then combining them with a desired amount of water to form the desired mixture of acid species. The benefit of providing at least one of the acid constituents in solid form is that you are able to reduce, control or eliminate the dilution effect that would otherwise exist if it was provided in the form of a solution, thereby producing a more effective or stronger leaching mixture.

In an example embodiment, the solid chemical compound may be provided in the form of a salt that is capable of forming a desired acid when combined with an acid solution or with water. In an example embodiment, it is desired that the salt be a fluoride salt, and more particularly one that is capable of forming HF, as HF is useful for facilitating the removal of tungsten found within the PCD body. Thus, a further advantage of providing the acid forming ingredient in the form of a solid or salt is that it avoids or eliminates the safety, health, and/or environmental precautions that must otherwise be taken in raw material storage if such ingredient was provided in the form of an acid solution.

In an example embodiment, the fluoride salt is combined with a $HNO_3$ solution to form a leaching mixture comprising $HNO_3$ and HF. A preferred fluoride salt useful for this purpose is ammonium bifluoride ($NH_4F$—HF). $NH_4F$—HF is a solid at room temperature and is soluble in $HNO_3$. The advantage of using such a salt is that it may be added to an oxidizing acid without dilution to thereby provide an improved degree of metal removal from the PCD body. Another potential advantage of using ammonium bifluoride, and obtaining ammonium bifluoride in solution, is the potential of the resulting ammonium ion to form complexes with the reaction product (cobalt nitrate) produced during the removal or leaching process. The formation of such complexes may be desirable because they may operate to increase the solubility of the cobalt nitrate in a strong acid environment, thereby allowing for enhanced reaction kinetics and possibly a higher number of parts that may be treated in a reaction chamber. While the use of a particular salt with a particular acid solution is described herein, it is to be understood that the example provided is representative of one combination of chemical species that may be used, and that combinations of other types of salts or solids from chemical compounds capable of forming acids when combined with an acid solution, water, or other water-containing solutions may be used to form improved leaching agents according to principles disclosed herein.

In another embodiment, it may be desirable to use a diluted leaching agent. For example, a solution which has been found to work satisfactorily in leaching PCD material is made from reagent grade acids, diluted with water. Thus, while reagent grade $HNO_3$ is 15.9 mol/liter, and reagent grade HF is 28.9 mol/liter and a 1:1 mixture of reagent grade $HNO_3$ and reagent grade HF produces 8.0 mol/liter $HNO_3$ and 14.5 mol/liter HF, a preferred mixture may comprise a concentration of approximately 5.3 mol/liter $HNO_3$ and approximately 9.6 mol/liter HF (ratio of 1:1:1 by volume of $HNO_3$-15.9 mol/liter:HF-28.9 mol/liter:and water). This was found to remove solvent catalyst material faster than a solution with a concentration of 8.0 mol/liter $HNO_3$ and 14.5 mol/liter HF (1:1 ratio by volume of $HNO_3$-15.9 mol/liter:HF-28.9 mol/liter). This gives indications that mobility and diffusion of the reacted species (in this case cobalt reacting to form cobalt nitrate) may be, in some cases, a rate-limiting step, and that reaction rates may be improved by decreasing the concentration of the acids. In other embodiments, more or less amounts of water may be used, and would thus effect the concentration of the acid components accordingly. In another particular embodiment, a fluoride salt such as $NH_4F$—HF may be combined with $HNO_3$ (70 percent solution-15.9 M (mol/liter)), and may optionally be diluted with water, as described above, to provide greater mobility and diffusion of the reacted species. In an example embodiment, the resulting leaching mixture comprises concentrations equivalent to the standard solution disclosed above. In another example, the concentration of the HF is in the range of from about 2.5-10 mol/liter, and from 2.5 to 7 mol/liter in another embodiment, and the concentration of the $HNO_3$ is in the range of from about 4.0-10 mol/liter. Use of the above-described leaching mixture may be used alone or in combination with any other of the techniques or methods described herein to provide accelerated leaching.

Accelerated leaching of a PCD body may be achieved by subjecting the leaching environment and thus the PCD body to different pressure conditions. This may involve subjecting the PCD body during the leaching process to pressures that are greater than atmospheric pressure, i.e., wherein the PCD body is subjected to an elevated pressure that facilitates the leaching process. This may also involve subjecting the PCD body during the leaching process to differential pressures, e.g., where a pressure at one location or surface of the PCD body is different than the pressure at another location or surface of the PCD body and that facilitates the leaching process.

As used herein, the term "elevated pressure" refers to pressures greater than atmospheric pressure. Suitable pressure levels may include elevated pressure levels ranging from about 5 to 345 bar, and ranging from about 5 to 100 bar in another embodiment. However, one skilled in the art would appreciate that the particular pressure may be dependent, for example, on the particular equipment used, the temperature selected, amount (and type) of leaching agent present, and total system volume.

Elevated pressure conditions may be obtained, for example, by conducting a leaching process in a pressure vessel. Suitable pressure vessels include any type of closed environment or container in which a leaching process may be performed with application of elevated pressure levels. One of ordinary skill in the art would appreciate that depending on the various combinations of accelerating techniques, the leaching may be performed for example, in an open container placed within a closed container, where the closed container is pressurized, or in a closed pressurized container (optionally within a second closed container). For example, one skilled in the art would appreciate that when using a closed container, the elevated pressures may be derived from (and thus dependent on) vapor pressures contained within the container at elevated temperatures. Thus, the extent of the pressure elevation may be a function of the temperature, amount of leaching agent present, and total system volume.

Differential pressures may be exerted onto the PCD body for example through the use of a fixture or an assembly that is configured to engage the PCD body in such a manner so as to exert a differential pressure onto or along one or more surfaces of the PCD body. When used in conjunction with a desired leaching agent, the presence of such differential pressure may operate to facilitate migration of the leaching agent through the desired region of the PCD body.

Accelerated leaching may also be achieved by using elevated temperatures alone or in combination with any other of the techniques, methods or leaching agents described herein. As used herein, the term "elevated temperature" refers to a temperature that is close to or above the room pressure boiling point of the liquid or agent in which the PCD body to be leached is submersed or subjected to. Suitable temperature levels may range from the boiling point to three times the boiling point of the leaching agent solution at room pressure, for example, from about 90 to 350° C. in one embodiment and from about 175 to 225° C. in another embodiment. Further, one skilled in the art would appreciate that the selection of an elevated temperature may be dependent, for example, on the type of leaching agent selected, so that, for example, the boiling point may be reached while still avoiding boiling of the leaching agent. Further, the source of the elevated temperatures is not a limitation of the scope of the present disclosure. Thus, one skilled in the art would appreciate that such heating may be provided, for example, by conventional resistance-based heating such as conventional oven or furnace heating or by volumetric-based heating such as microwave heating.

In various embodiments, a PCD object to be leached may be disposed in a pressure vessel with leaching agent(s), and the pressure vessel and its contents be exposed to elevated temperatures. Such vessels may include those known in the art as acid digestion bombs. Vessels suitable for use in embodiments of the present disclosure include those described, for example, in U.S. Pat. Nos. 5,369,034, 4,933,529, 4,882,128, and 6,744,024, which are all herein incorporated by reference in their entirety. Alternative types of vessels may include autoclaves. Various vessels are commercially available, for example, from Parr Instrument Company (Moline, Ill.) and Berghof/America (Coral Springs, Fla.).

Figure 2:
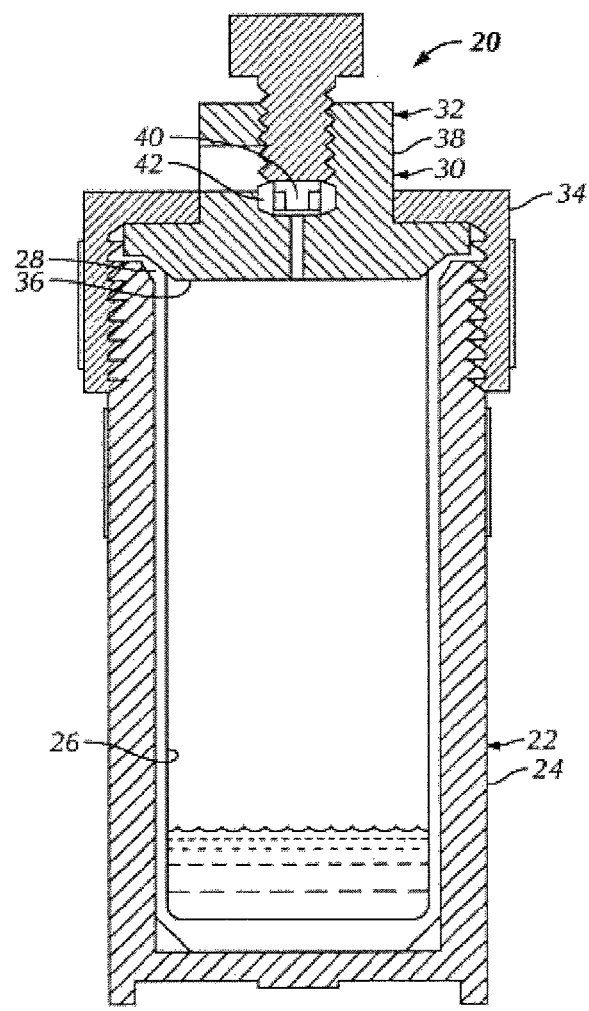
FIG. 2 is a cross-sectional side view of an example of a pressure vessel that may be used in accordance with a disclosed embodiment.

FIG. 2 illustrates an example a pressure vessel constructed according to one embodiment of the present disclosure. The pressure vessel 20 includes a container body 22 (which may be comprised of two parts, body 24 and liner 26) having an opening 28 at the top end thereof. The container body 22 is closed by closure 30, which includes closure portion 32 and holding collar 34 that threadably engages with body 24. Closure portion 32 includes sealing section 36 and boss 38. Body 24 is constructed from a material having sufficient strength (tensile strength) and other physical characteristics, including dimensions, so that it may withstand internal pressures in ranges likely to be encountered in various heating and digestion operations in which the container may be employed. Such pressure ranges may range, for example, up to 5000 psi. However, a venting means 40 is provided for the container 20 so that if pressures generated within the container 20 exceed the limits for which the container is designed, the generated pressures will vent from the container to the external environment. Such venting means 40 may include a rupturable diaphragm (not shown separately), which under normal pressures seals the interior of the container 20 from passageways 42 leading to the exterior environment Most suitable synthetic organic polymeric plastic materials for such body 22 are any of the polyether imides, such as those sold under the ULTEM® trademark by General Electric Corporation, but others of the "engineering plastics," fiber reinforced plastics, such as glass fiber reinforced polyesters or polyethers, or other polymers known to be of good strengths and/or transmissive of microwaves (when microwave heating is used) may also be used. Further, one skilled in the art would appreciate that any configuration of a sealed, but ventable container may be used for forming a pressure vessel, such as the one shown in FIG. 2, to leach PCD bodies in accordance with the present disclosure.

Inside the body 24, as a part of the container body 22, is the liner 26, which is essentially or completely transparent to microwave radiation and is also resistant to damage from chemical attacks by strong chemicals, such as strong acids, often employed as leaching agents. Materials of construction suitable for manufacture of such liners, such as fluorinated alkylenes or perfluorocarbons, e.g., polytetrafluoroethylene and other polymers of this type sold under the tradename TEFLON® or other tradenames may be employed, with the preferred materials being TEFLON PFA and TEFLON FEP, but other chemically resistant plastics, such as chloroprene, silicone, ethylene, propylene and other suitable polymers, under the proper circumstances, may also be used. However, at elevated temperature such polymers and others which are satisfactorily resistant to chemical reactions with the materials being heated or by the digestion mixes are not usually sufficiently strong to resist pressures that may be developed in the container and therefore such are normally employed only as liners within strengthening body members which are made of other, stronger materials.

Further, one skilled in the art would appreciate that, in alternative embodiments, the liner and body of the vessel may be made of a single material, without the need for a separate liner. For example, when using microwave heating, if microwave and other radiant energy-transmissive materials that are available or may become available are satisfactorily resistant to chemical damage from the contained materials and are strong enough to resist pressures developed during the heatings of such materials in the closed container, the container body means may be made of one piece of one material without the need for a separate liner.

While the above description references microwave transparent materials for use in the pressure vessel, one of ordinary skill in the art would appreciate that should a pressure vessel be used without microwave energy, the material requirements for liner and/or body container may vary accordingly. Further, while the above description has described one particular type of pressure vessel in obtaining elevated pressures, no limitation is intended on the scope of the present invention. One of ordinary skill in the art would recognize that the elevated pressure may be achieved directly or indirectly. That is, it is specifically within the scope of the present invention that the elevated pressure may result as a by-product of one or more other applied conditions.

Accelerated leaching may also be achieved through the use of vibration or ultrasonic energy alone or in combination with any of the other techniques, methods and/or materials described herein. In an example embodiment, the application of pressure may be coupled with the application of ultrasonic energy to accelerate the leaching process. Ultrasonic energy is mechanical, vibratory energy in the form of sound that operates at frequencies beyond audible sound (18,000 cycles per second and greater). An ultrasonic stack is generally formed of a converter or piezoelectric transducer, an optional booster and a sonotrode (also called a horn).

In a typical arrangement, the piezoelectric transducer is formed of a piezoelectric crystal connected to an electrical energy source, such as a battery, through a wire. Piezoelectric crystals may be used to convert electrical energy into mechanical energy or be used to convert mechanical energy into electrical energy. For example, in one embodiment, electrical charges may be sent from the electrical energy source through the wire to the piezoelectric crystal.

The electrical charges may then be converted by the piezoelectric crystal into acoustic energy (e.g. mechanical energy) such that an acoustic signal may be produced. The piezoelectric crystal may be comprised of many materials, ceramics and quartz crystals being most common. Specifically, in one embodiment, the piezoelectric crystal may be comprised of Kézite K600, available from Keramos of Piezo Technologies, which is a modified lead zirconate titanate piezoelectric ceramic.

The material of the piezoelectric crystal may then be modified in various ways to produce different wave modes of the acoustic signal. For example, the overall shape of the piezoelectric crystal determines a sound field of the acoustic signal produced from the piezoelectric crystal.

Further, the thickness of the piezoelectric crystal may determine the frequency of the acoustic energy produced by the piezoelectric crystal. Specifically, the piezoelectric crystal produces a wavelength about twice its thickness.

Boosters may be used to modify the amplitude of the mechanical vibration. A sontotrode, or horn, may be used to apply the vibration. All three elements of the stack may be specifically tuned to resonate at the same exact ultrasonic frequency (typically 20, 30, 35 or 40 kHz)

As noted above, a power supply (also known as an electronic ultrasonic generator) may be used to deliver a high-power AC signal with frequency matching the resonance frequency of the piezoelectric crystal.

Figure 3:
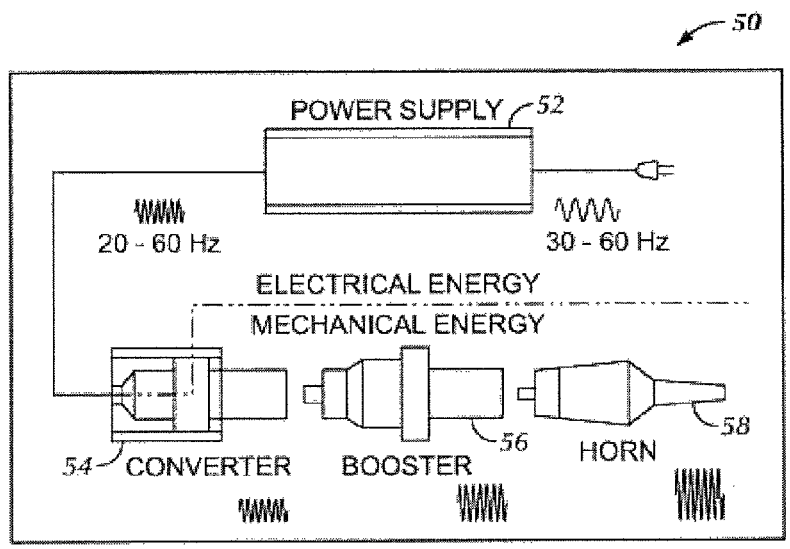
FIG. 3 is a schematic view of an ultrasonic emitter that may be used in accordance with a disclosed embodiment.

FIG. 3 illustrates a schematic example of an ultrasonic apparatus 50 for use in disclosed embodiments. Desired high-frequency electrical energy is delivered, via a power supply 52, to a piezoelectric crystal (shown as converter 54) where the high-frequency electrical energy is converted to high-frequency ultrasonic mechanical energy. That energy is then sent to a booster 56, and finally is transferred to a horn 58.

The effect of applying ultrasonic energy to a leaching process may have the effect of providing up to an 80 percent increase in leaching depth after 2 hours, when compared to a leaching process without ultrasonic energy, and up to a 90 percent increase in leaching depth after 4 hours, again when compared to a leaching process without ultrasonic energy. This is for leaching a PCD body using a leaching agent comprising a 1:1 mixture of HF and $HNO_3$ where each is provided in solution form. In a test using the 1:1:1 ratio of nitric acid, hydrofluoric acid, and water described earlier it was found that the use of ultrasonic energy in combination with elevated pressure was able to increase the amount of solvent catalyst removal by approximately 35%, despite the fact that the temperature of the pressure vessel equipped with ultrasonics was maintained at 140° C. and the pressure vessel without ultrasonics was maintained between 200-210° C.

While the use of vibration energy has been disclosed, it is to be understood that agitation may be used to accelerate the removal process. For example, such agitation may be caused by moving the leaching agent relative to the object being leached in a desired manner. Alternatively, such agitation may be caused by moving the object being leached relative to the leaching agent. The agitation movement may have a controlled or random character.

While particular treatment conditions, processes and/or materials have been described above for purposes of removing the catalyst material from a PCD body, it is to be understood that treatment conditions, processes and/or materials processes other than those described above may be used alone or in combination with such afore-described treatment conditions, processes and/or materials. These include but are not limited to electrical discharge or other electrical or galvanic processes, e.g., electrolytic process and the like, and/or gaseous phase removal or reduction. Gaseous phase removal involves subjecting the PCD body to a halogen gas or gaseous environment containing a source of halide ions at a desired elevated temperature. The gaseous phase material contacts and reacts with the catalyst material within the PCD body at elevated temperature to react with and/or volatize the catalyst material and other metals or metal compounds that may be present to thereby facilitate their removal from the PCD body.

The gaseous compound may comprise a halogen gas, an inert gas, an acid gas, and/or a mixture thereof. In an example embodiment, the gaseous environment comprises some amount of chlorine, and may also include some amount of another gas such as argon gas or the like. Hydrogen may also be used and the source may be hydrogen chloride gas, or an ammonium halide salt, which in the case of ammonium chloride decomposes at temperature to form nitrogen gas, hydrogen gas and chlorine gas, wherein the hydrogen gas and chlorine gas may react in situ to form hydrogen chlorine gas.

Further, as mentioned above, while the above discussion has applied to PCD cutting elements, those having ordinary skill in the art will appreciate that these techniques may be more generally applied to any material that requires the leaching of a material (such as a catalyst or binder agent) from its surrounding matrix. In particular, embodiments disclosed herein apply to "free-standing" PCD bodies, such as, PCD wafers having no carbide substrate. Such PCD bodies may have been formed "free-standing" or may have been detached from a carbide substrate prior to leaching. In a particular embodiment, the PCD bodies may be at least 1 mm thick, and at least 1.5 or 2 mm thick in alternate embodiments. However, in other particular embodiments, where leaching of the entire PCD is not desired, the PCD bodies may be attached to a carbide substrate.

Accelerated leaching may be achieved during a single step using one or more of the techniques, processes and/or materials disclosed herein, or may be achieved by using more than one step. In a single step process, the accelerated leaching of the PCD body is achieved by simply subjecting the PCD body to the desired leaching agent and any additional conditions, e.g., elevated pressure, pressure differential, elevated temperature, and/or vibration energy. The product resulting from the process is then taken and used to form a desired cutting or wear product.

Alternatively, if a leached PCD body having a greater degree of purity is desired, a multi-step process may be used. As used herein, the term "purity" is used to refer the relatively improved diamond content in the PCD body and the reduced content of any non-diamond materials. It has been discovered that a higher purity leached PCD diamond body may be provided through the use of a multi-step treatment process.

In an example embodiment, during a first treatment step the PCD body is exposed to a desired leaching agent or mixture. The leaching agent or mixture may be one of those described above. In an example embodiment, the first treatment step is conducted at an elevated temperature as described above. Additionally, the first treatment step may be conducted under conditions of both heat and pressure as described above. During this first treatment step, the PCD body is subjected to the leaching agent for a desired duration of time desired to obtain the finally leached PCD diamond body, i.e., the catalyst material is removed from the entire PCD diamond body.

During a conventional single step leaching process, once the PCD body has been leached, it is rapidly cooled down with a forced cooling and then taken for subsequent processing and/or forming into the desired cutting or wear element. It has been discovered that during this rapid cool down, certain unwanted by-products from the leaching process, in the form of oxides, are formed. These oxides are insoluble, and thus remain in the leached PCD or TSP body and are present during any subsequent processing. The presence of such insoluble oxides or contaminates within the TSP body may be undesired as they may impair any subsequent processing of the TSP body that may involve introducing an infiltrant material therein, e.g., when used to attached the TSP body to a substrate by infiltration of an intermediate material or a constituent material of a substrate therein for the purpose of forming an attachment bond therebetween. Additionally, the presence of such contaminates within the TSP body may operate to degrade the diamond bonding within the body.

It has been discovered that the formation and presence of such unwanted oxides in the TSP body may be avoided by carefully controlling the first treatment process and, more specifically, by carefully controlling the cooling rate of the TSP body and leaching agents after the leaching process has been completed. A slow reduction of the TSP body and leaching agent temperature during the first treatment step after leaching has been shown to avoid or reduce the extent that unwanted oxides are formed, and promote the preferential formation of soluble salt. In a particular embodiment, cooling rates may be no faster than about 75 degrees/hour, no faster than about 60 degrees per hour in another embodiment, and no faster than about 45 degrees in yet another embodiment. These soluble salt form in the interstitial regions of the TSP body. The exact types of soluble salts that are formed will depend on the type of catalyst or binder material that is used, whether the source of the catalyst material is a substrate, and the types of leaching agents that are used.

In an example embodiment where the catalyst material is cobalt, and tungsten is present in the diamond body, e.g., provided from a substrate used as a source of the catalyst material, and the leaching agent includes $HNO_3$, the salt present in the diamond PCD body will be nitrate salts of cobalt and tungsten. Again, unlike the oxides, such salts are soluble and may be removed from the TSP body during a further or subsequent treatment step.

In an example embodiment second treatment or "clean up" step, the TSP body that now includes the soluble salts is placed into water that is at an elevated temperature, e.g., boiling water. This treatment may be conducted at atmospheric pressure or at elevated pressure via use of a pressurized container as described above. During this second treatment step, the soluble salts are removed from the TSP body to produce a TSP body having a high level of purity with little or no contaminate or by-product materials disposed therein that will interfere with any subsequent infiltration process, or that will operate to degrade diamond bonding within the TSP body.

In a particular embodiment, the cleaning process may involve multiple rinses and/or involve multiple types of treatments. For example, following a cool-down from leaching (such as described above), the thermally stable diamond body having byproducts present in the interstitial regions may be placed in a bath of water subjected to ultrasonic energy. The ultrasonic energy may aid the water (or other solvent) to infiltrate through the pores of the diamond body. Alternative solvents that may also optionally be used to clean the TSP body may include alcohols and/or acetone, which may be used to aid in solubilizing and/or transporting any by-products that are less compatible in water than these solvents. Once water (or other solvent) occupies the pore space, the water provides a medium through which the vibrational waves may travel to reach the byproducts residing in the pores. The waves create microscopic gas pockets during periods of positive pressure, which implode and release a burst of energy during periods of negative pressure, disrupting weak molecular binding forces in the by-products, including insoluble oxides such as complex cobalt and/or tungsten oxides, as well as soluble salts. Thus, the imploding bubbles and bond disruption occurs wherever the solution goes. Once the bonds are disrupted (forming smaller pieces of by-products and/or disrupting bonds between the by-products and the surrounding diamond network), the solvent may transport the by-products out of the diamond body.

Exemplary conditions may include a power of at least 500 watts (and at least 800 watts in a particular embodiment), a frequency ranging from 5 to 50 kHz (and from 15-35 kHz in a particular embodiment), and an exposure time of at least one hour (and at least two hours in a particular embodiment. However, other conditions are envisioned as also being within the scope of the present disclosure, depending, for example, on the level of byproduct formation and desired purity level. For example, the exposure time may be as low as 15 minutes, and energy levels of less than 500 watts may be used Further, one skilled in the art should appreciate after reading the teachings of the present application that if a lower energy is used, for example, it may be desirable to vary other conditions to counterbalance the change in energy.

Following an ultrasonic treatment, the diamond part may be transferred to a pressure vessel, such as those described above that are used in the leaching process, with fresh water. The pressure vessel (and its contents) may be heated, such as to a temperature ranging from about 130° F. to 230° F., or 160° F. to 200° F. in a particular embodiment. Such pressurizations may last at least 4 hours in one embodiment, at least 6 or 8 hours in another embodiment, or at least 10 hours or 12 hours in yet another embodiment. When the temperature is elevated, pressure is generated within the pressure vessel. This increase in pressure may allow for the water to be forced into the diamond body, and soluble byproducts present in the diamond body be allowed to diffuse out until an equilibrium is reached. Following the pressurization, the ultrasonic treatment may be repeated. Further, additional pressurizations and ultrasonic treatments may also be repeated. In a particular embodiment, at least two ultrasonic treatments and at least one pressurization may be performed. In an even more particular embodiment, at least three ultrasonic treatments and at least two pressurizations may be performed. The number of treatments may depend on the amount of material removed after each stage (which may be determined by measuring the weight percentage reduction in the diamond body after each stage) and the expected amount of material to be removed. While it may be difficult to quantify the amount of material expected to be contained within a diamond body (and recognizing that the amount may vary depending, for example, on the cooling conditions following the leaching step), several optimizing tests varying time, power, frequency, etc. may be performed for a given leached sample lot to determine the particular combination of parameters that may cumulatively result in the greatest relative reduction in diamond weight. While a preferred embodiment may provide for alternating ultrasonic treatments and pressurizations, it is also within the scope of the present disclosure that only ultrasonic treatments and/or pressurizations may be used, depending on the level of byproduct formation and desired purity level.

Shown in Table 1 below are several examples of cleaning steps that may be carried out in accordance with embodiments of the present disclosure, and the resulting percent weight reductions in the diamond body. Each ultrasonic (US) treatment was performed in water for 3 hours at the indicated energy and at a frequency of 25 kHz. Between two ultrasonic treatments, the diamond body was placed with water in a pressure vessel, and the temperature was increased to 180° F. for 12 hours, and then allowed to cool to ambient temperatures in 5 hours. The diamond body was weighed following each ultrasonic treatment to calculate the percent weight reduction in the diamond body due to the removal of byproducts therefrom. In particular embodiments, the cleaning may result in a cumulative percent weight reduction of at least 1.5 wt %, or at least 2.5 wt % or at least 3 or 3.5 wt % in other embodiments. Further cessation of the cleaning treatments may be based on the amount removed within each subsequent step. For example, a reduction of less than 0.1 wt % (such as in a 3 hour interval) for a given step may indicate a sufficient level of cleaning and/or be representative of diminishing effectiveness of the washing process when undergoing subsequent wash cycles.

TABLE 1

| Sample No. | Energy | Schedule | Diamond Body (g) | Reduction amount (g) | Percent weight reduction |
|---|---|---|---|---|---|
| 1 | 400 W | Initial | 16.718 | | |
| | | post 1st US | 16.511 | 0.207 | 1.24 |
| | | post 2nd US | 16.46 | 0.051 | 0.31 |
| | | post 3rd US | 16.418 | 0.042 | 0.25 |
| 2 | 1000 W | Start | 16.802 | | |
| | | post 1st US | 16.28 | 0.522 | 3.11 |
| | | post 2nd US | 16.217 | 0.063 | 0.37 |
| | | post 3rd US | 16.203 | 0.014 | 0.08 |
| 3 | 400 W | Start | 16.59 | | |
| | | post 1st US | 16.379 | 0.211 | 1.27 |
| | | post 2nd US | 16.317 | 0.062 | 0.37 |
| | | post 3rd US | 16.281 | 0.036 | 0.22 |
| | | post 4th US | 16.273 | 0.008 | 0.05 |
| 4 | 1000 W | Start | 16.772 | | |
| | | post 1st US | 16.272 | 0.5 | 2.98 |
| | | post 2nd US | 16.23 | 0.042 | 0.25 |
| | | post 3rd US | 16.208 | 0.022 | 0.13 |
| | | post 4th US | 16.188 | 0.02 | 0.12 |

While a particular technique has been described above for carrying out the second treatment or "clean up" step, other techniques or subsequent follow up treatment steps, may be used. For example, any oxides, additional catalyst material, or by-product may be removed from the TSP body by conducting an additional reduction process, such as by electrolysis process or gaseous halogen phase reduction as noted above.

By first controlling the first treatment step to preferentially form soluble salts as leaching by-products rather than insoluble oxides, and then by performing the second treatment "clean up" step, the resulting TSP body may have a material microstructure that does not have clogged or filled interstitial regions. In certain PCD constructions where a reinfiltration of the TSP body is desired, the TSP body produced in such manner facilitates a more thorough and uniform infiltration process. The uniform infiltration of a material into the TSP body is desired to facilitate distribution of the extreme pressures applied to the TSP body, e.g., when such infiltration is conducted during an HPHT process, to all internal pore surfaces and keeps the TSP body in the diamond stable range during such infiltration and any attachment to a substrate. Additionally, removing the contaminates from the TSP body may create the highest bond strength between the infiltrant material and the TSP body in both the pore surfaces and at the interface region.

Additionally, removing the contaminates from the TSP body may greatly reduce any unwanted degradation of the diamond-to-diamond bonds within the TSP body.

Once the PCD body is leached, the resulting material microstructure comprises a first matrix phase of the bonded-together diamond grains and a second phase comprising a plurality of empty interstitial regions dispersed within the matrix phase. The resulting TSP body is substantially free of the catalyst material used to initially form or sinter the diamond body. Thus, at the end of the leaching process, the interstitial regions are substantially empty so that the second phase may be described as a plurality of voids or empty regions dispersed throughout the diamond-bonded matrix phase.

Further when such "free-standing" PCD bodies are leached, in particular embodiments, the leached PCD bodies may be attached (or reattached) to a substrate, to facilitate attachment to a bit, cutting tool, or other end use application or device. Such methods of reattachment may include sintering a leached PCD body with a substrate in a second HPHT sintering step, such as discussed in U.S. patent application Ser. No. 12/026,398, filed on Feb. 5, 2008, which is assigned to the present assignee and which is incorporated herein by reference in its entirety. Further, as discussed in U.S. patent application Ser. No. 12/026,398, the interstitial regions (or at least a portion thereof) previously occupied by the catalyzing material used to initially form the diamond body that has been removed by the leaching process may optionally be filled with a variety of infiltrants or replacement materials using any number of techniques, including liquid-phase sintering under HPHT conditions.

The type of infiltrant or replacement material is not a limitation on the scope of the present disclosure. Rather any type of infiltrant or replacement materials may be used, including, for example, non-refractory metals such as copper or other Group IB metals or alloys thereof, Group VIII metals such as cobalt, nickel, and iron, ceramics, silicon, and silicon-containing compounds, ultra-hard materials such as diamond and cBN, and combinations thereof. In a particular embodiment, the source of infiltrant or replacement material may be a substrate that is attached to the leached PCD body during an HPHT process. Substrates useful in this regard may include those substrates that are used to form conventional PCD, including those formed from metals, ceramics, and/or cermet materials that contain a desired infiltrant, such as a substrate formed from WC—Co. Further, in specific embodiments, the substrate may be formed of a cermet such as WC and a binder material including Group IB metals or alloys thereof such as Cu, Ag, Au, Cu—W, Cu—Ti, Cu—Nb, or the like.

In an embodiment where it is preferred that a material such as cobalt does not infiltrate into the leached PCD during substrate attachment by HPHT process, it may be desirable to use a substrate having at least one infiltrant material with a melting temperature below about 1,200° C., and limiting the HPHT sintering temperatures accordingly so that such the replacement material infiltrates into the PCD body without causing any catalyst material present in the substrate to melt and enter the PCD body.

Additionally, although a substrate may be attached to the leached PCD body during the introduction of the replacement infiltrant material, it is also understood that the substrate may alternatively be attached to the PCD body after the desired infiltrant has been introduced into the PCD diamond body. In such an embodiment, the infiltrant material may be introduced, for example, by an HPHT process that does not use the substrate material as an infiltrant source, and the desired substrate may be attached to the diamond body by a separate HPHT process or by other method, such as by brazing, welding, or the like.

Further, one skilled in the art would also appreciate that, as described in U.S. patent application Ser. No. 12/026,398, an intermediate material may be attached between the PCD body and a substrate to facilitate attachment between the substrate and PCD body and/or that may act as a barrier to minimize, control or prevent the migration of a particular constituent material within the substrate into the PCD body. Alternatively, if such constituent material does migrate or infiltrate into the PCD body during reattachment, it is within the scope of the present disclosure that the PCD body filled with the infiltrant material may be subsequently treated to remove a portion of the infiltrant material therefrom. Techniques useful for removing the infiltrant material include chemical treatment such as acid leaching or aqua regia bath, electrochemical treatment, such an electrolytic process, liquid metal solubility techniques, liquid metal infiltration techniques, those techniques, methods and using those materials described above, or combinations thereof. For example, in a particular embodiment, the infiltrant material may be removing using a leaching agent such as the acid mixture of two different acid species formed by combining an acid solution and at least one acid-forming compound. Alternatively, the an acid mixture of $HNO_3$ at a concentration of 2.5 to 10 mol/liter and HF at a concentration of 4 to 10 mol/liter may be used to remove the infiltrant material from a portion of the diamond body.

Figure 4A:
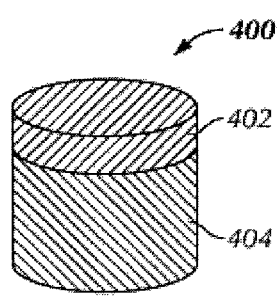
FIGS. 4A to 4E are perspective views of different example PCD constructions prepared according to principles of the present disclosure.
Figure 4B:
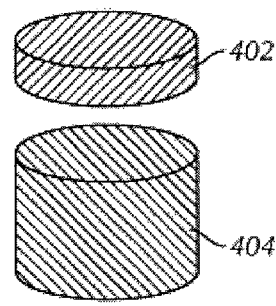

FIGS. 4A to 4E illustrate an example PCD construction at different steps of being processed. FIG. 4A illustrates a PCD construction 400 comprising a PCD body 402 having a catalyzing or binder material found in the interstitial regions between the diamond-bonded grains. In this particular embodiment, the PCD body was formed using a substrate 404 as a source of the catalyzing material, which substrate 404 is attached thereto. As illustrated in FIG. 4B and discussed above, the PCD body 402 may be formed without the use of a substrate 404, or any substrate may be removed from the PCD body prior to treatment of the PCD body 402 to remove the catalyzing material using the techniques, methods, and/or materials disclosed herein.

Figure 4C:
Figure 4D:
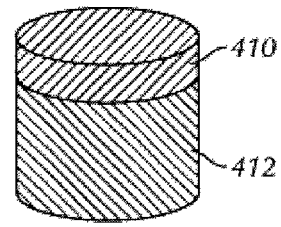

Treating of the PCD body 402 removes at least a substantial portion of the catalyzing material used to initially form the diamond body from the interstitial regions, leaving a PCD body or TSP body 408 as illustrated in FIG. 4C having a plurality of voids distributed therein. At this stage, the interstitial regions within the leached PCD body or TSP body are substantially empty. As noted above, if desired, the so-formed TSP body may be treated to introduce a desired material into all or part of the empty interstitial regions. FIG. 4D illustrates the treated PCD body 410 as attached to a substrate 412, e.g., by HPHT sintering or other technique.

Figure 4E:
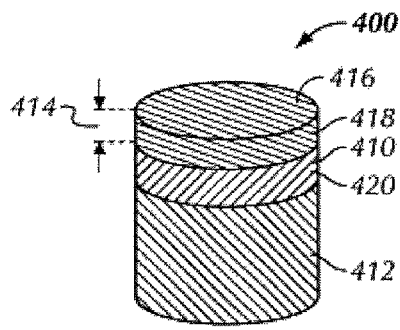

FIG. 4E illustrates the PCD construction 400 at a further stage of processing where the reinfiltrated PCD body 410 has been treated to remove the infiltrant material from a desired depth 414 extending from an outer surface 416 of the PCD body 410. Accordingly, the resulting PCD body 410 comprises a first region 418 extending from the outer surface to the depth 414 that is substantially free of the infiltrant material, and a second region 420 extending from the depth 414 to the substrate 412. It is to be understood that the outer surface 416 may be any surface of the PCD body that may or may not be a working surface. In an example embodiment, the infiltrant material may be removed from the outer surface extending along a top and/or side of the PCD body.

A feature of using the multi-step catalyst removal process described above is that it may provide a high-purity treated PCD body, i.e., one that is substantially free of unwanted oxides and/or other leaching byproducts. While the absence of these oxides may operate to facilitate reinfiltration of the PCD body with a desired infiltrant material, such absence may also facilitate the subsequent removal or releaching of the infiltrant material from a desired region of the PCD body. Specifically, the absence of such oxides provides for greater consistency/uniformity, and reduced degree of variability, in the infiltrant material removal depth.

Figure 5:
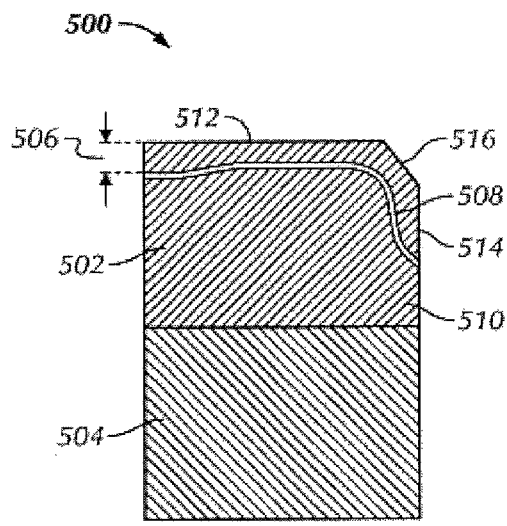
FIG. 5 is a cross sectional view of a prior art PCD construction.
Figure 6:
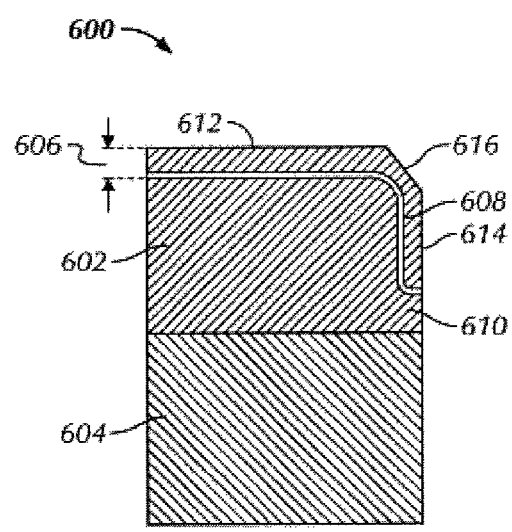
FIG. 6 is a cross sectional view of a PCD construction that has been treated using a multi-step removal process according to principles of the present disclosure.

FIG. 5 illustrates in cross section a prior art PCD construction 500 comprising a PCD body 502 that has had the catalyst material removed therefrom by a conventional single-step leaching process, that was subsequently reinfiltrated by an infiltrant material and attached to a desired substrate 504. Further, the PCD body 502 has been treated or leached to remove the infiltrant material from a desired depth 506, creating a PCD body first region 508 that is substantially free of the infiltrant material, and a PCD body second region 510 that includes the infiltrant material. As illustrated in FIG. 5, the depth of the infiltrant material removal is not uniform moving from a position at the center 512 of the body to a position along an edge 514 of the body adjacent a bevel or chamfer 516, but rather varies greatly depending on position within the body. This is believed to be a result of the oxides and other leaching byproducts left in the PCD body during the initial step of removing the catalyst material therefrom. FIG. 6 illustrates in cross section a PCD construction 600 comprising a PCD body 602 that has been treated using the multi-step catalyst removal process described above. The PCD body 602 was further reinfiltrated with a desired infiltrant material and attached to a desired substrate 604. The PCD body 602 was treated or leached to remove the infiltrant material from a desired depth 606, creating a PCD body first region 608 that is substantially free of the infiltrant material, and a PCD body second region 610 that includes the infiltrant material. As illustrated in FIG. 6, the depth of the infiltrant material removal is substantially uniform within the PCD body moving from a position at the center 612 of the body to a position along an edge 614 of the body adjacent a bevel or chamfer 616. Such uniformity may be quantified by a variation of the depth within the construction being less than about 5 percent. Following all processing and treatment steps, the cutting elements of the present disclosure may have a PCD body having diamond grains with an average grain size of less than 20 microns, and ranging from about 5 to 15 microns in a particular embodiment. Such average grain sizes after treatment may be estimated by using electron backscatter diffraction of cross-sections of multiple PCD bodies with a scanning electron microscope, and using a mean linear intercept method.

Further, while many of the embodiments described herein involve leaching a PCD wafer so that substantially all of the catalyst material is removed therefrom, some embodiments may also relate to partial leaching of a PCD body that may be unattached or attached to a carbide substrate. Specifically, the leaching agents described herein may be used to partially leach a PCD body so as to create a first region extending a given depth from a surface of the PCD body having the interstitial regions substantially empty of the catalyst material, and a second region adjacent the first region having the interstitial regions occupied by the catalyst material. The resulting leach profile may be similar to that shown in FIG. 6, with the exception that a catalyst material, and not an infiltrant material is being removed. Further, following a partial leaching, whether using the leaching agents described herein or other leaching agents, it also may be desirable to use the cleaning processes described herein on such partially leached PCD body.

Advantageously, embodiments disclosed herein may provide a reduced treatment time and/or an increased level of diamond purity as compared to prior art techniques. In addition, some embodiments may allow the use of weaker acids, which may reduce the likelihood of injury during the manufacturing process, while some embodiments may allow the use of stronger acids while at the same time reducing any health, safety and/or environmental issues associated with the same. Additionally, some embodiments provide a leached product having a high level of purity for the purpose of both providing improved performance properties of thermal stability, and facilitating any subsequent infiltration processes that may be used.

PCD constructions formed as described herein may be used in a number of different applications, such as tools for mining, cutting, machining and construction applications, where the combined properties of thermal stability, wear and abrasion resistance, and strength and toughness are highly desired. Such PCD constructions are particularly well suited for forming working, wear and/or cutting components in machine tools and drill and mining bits such as roller cone rock bits, percussion or hammer bits, diamond bits, and shear cutters.

Figure 7:
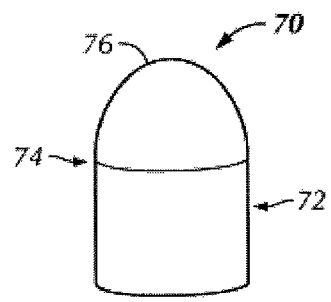
FIG. 7 is a side view of an example PCD construction provided in the form of a cutting insert.

FIG. 7 illustrates an embodiment of a PCD construction prepared as disclosed herein provided in the form of an insert 70 used in a wear or cutting application in a roller cone drill bit or percussion or hammer drill bit. For example, such inserts 70 are constructed having a substrate portion 72, formed from one or more of the substrate materials disclosed above, that is attached to a PCD body 74 that is thermally stable. In this particular embodiment, the insert comprises a domed working surface 76 that is thermally stable. The insert may be pressed or machined into the desired shape or configuration prior to the treatment for rendering the selected region thermally stable. It is to be understood that such PCD constructions may be used with inserts having geometries other than that specifically described above and illustrated in FIG. 7.

Figure 8:
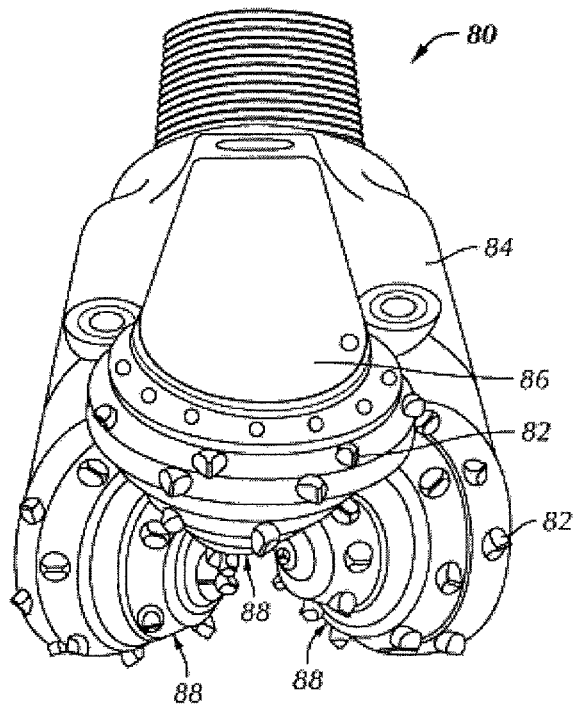
FIG. 8 is a perspective view of a rotary cone drill bit comprising a number of the cutting elements illustrated in FIG. 5.

FIG. 8 illustrates a rotary or roller cone drill bit in the form of a rock bit 80 comprising a number of the wear or cutting inserts 82 disclosed above and illustrated in FIG. 7. The rock bit 80 comprises a body 84 having three legs 86 extending therefrom, and a roller cutter cone 88 mounted on a lower end of each leg. The inserts 82 are the same as those described above comprising the PCD construction that is thermally stable, and are provided in the surfaces of each cutter cone 88 for bearing on a rock formation being drilled.

Figure 9:
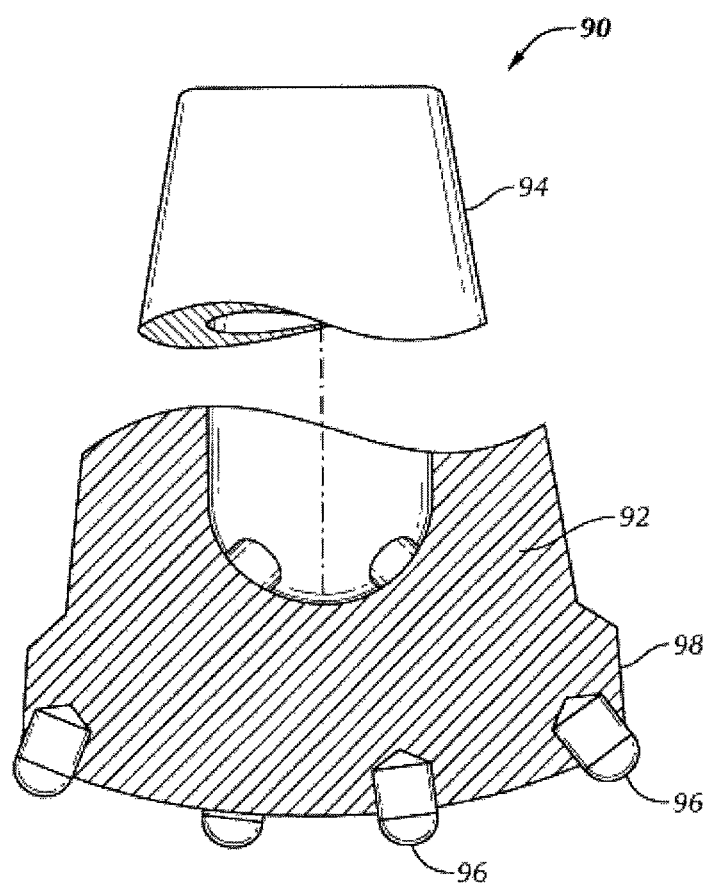
FIG. 9 is a perspective view of a percussion drill bit comprising a number of the cutting elements illustrated in FIG. 5.

FIG. 9 illustrates the cutting insert described above and illustrated in FIG. 7 as used with a percussion or hammer bit 90. The hammer bit generally comprises a hollow steel body 92 having a threaded pin 94 on an end of the body for assembling the bit onto a drill string (not shown) for drilling oil wells and the like. A plurality of the inserts 96 are provided in the surface of a head 98 of the body 92 for bearing on the subterranean formation being drilled.

Figure 10:
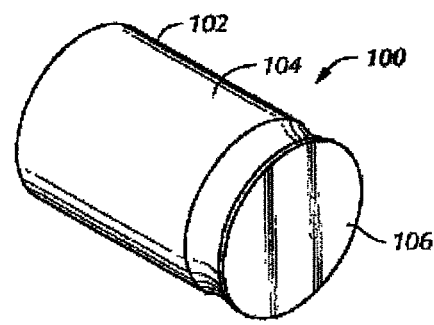
FIG. 10 is a perspective view of another example PCD construction provided in the form of a cutting element or shear cutter.

FIG. 10 illustrates a PCD construction prepared as disclosed herein embodied in the form of a shear cutter 100 used, for example, with a drag bit or fixed blade bit for drilling subterranean formations. The PCD shear cutter comprises a PCD body 102 that is sintered or otherwise attached to a cutter substrate 104 as described above. The PCD body includes a working or cutting surface 106 that is thermally stable. The shear cutter working or cutting surface may include the upper surface and a beveled surface defining a circumferential edge of the upper surface. It is to be understood that PCD constructions may be used with shear cutters having geometries other than that specifically described above and illustrated in FIG. 10.

Figure 11:
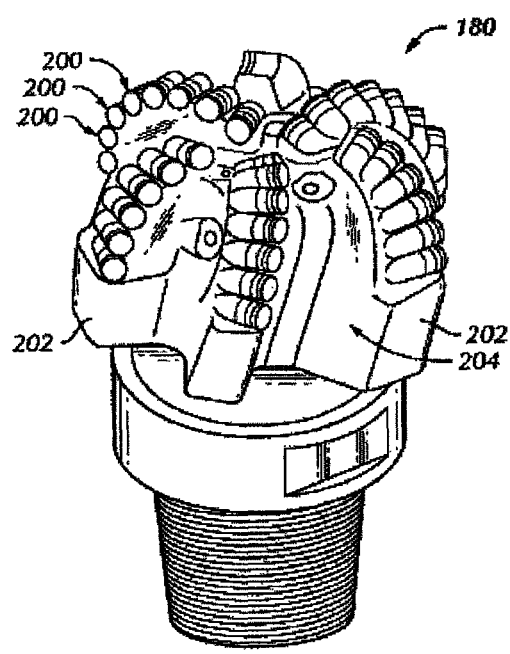
FIG. 11 is a perspective view of a fixed blade drill bit comprising a number of the cutting elements illustrated in FIG. 8.

FIG. 11 illustrates a drag bit 180 comprising a plurality of the shear cutters 200 described above and illustrated in FIG. 10. The shear cutters are each attached to blades 202 that extend from a head 204 of the drag bit for cutting against the subterranean formation being drilled. Because the PCD shear cutters of this disclosure include a metallic substrate, they are attached to the blades by conventional method, such as by brazing or welding.

Other modifications and variations of PCD constructions and methods, techniques and/or materials for making the same as described and illustrated herein will be apparent to those skilled in the art. Further, it is also intended that PCBN constructions or any other sintered ultrahard material may be used in all of such embodiments as a diamond-like material. It is, therefore, to be understood that within the scope of the appended claims, this invention may be practiced otherwise than as specifically described.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for making a thermally stable cutting element comprising:
forming an acid mixture containing two different acid species by combining an acid solution and at least one acid-forming compound, wherein the at least one acid-forming compound is provided in solid form, and wherein the at least one acid-forming compound produces an acid that is different than the acid solution;
treating at least a portion of a sintered diamond body comprising:
placing the sintered diamond body in the acid mixture, wherein the sintered diamond body comprises:
a matrix phase of bonded-together diamond grains;
a plurality of interstitial regions dispersed within the matrix phase; and
a metal material disposed within a plurality of the interstitial regions;
subjecting the acid mixture and sintered diamond body to an elevated temperature; and
reducing the temperature of the acid mixture and sintered diamond body in a controlled manner so as to form soluble salts within the sintered diamond body;
wherein the treating removes the metal material from at least a portion of the plurality of interstitial regions; and
removing the sintered diamond body from the acid mixture after a predetermined length of time, wherein at least a portion of the diamond body removed from the acid mixture is substantially free of the metal material and is a thermally stable diamond body.

2. The method of claim 1, wherein the treating step further comprises subjecting the sintered diamond body and acid mixture to at least one of elevated temperature conditions, elevated pressure conditions, vibration energy, or ultrasonic energy.

3. The method of claim 1, wherein the sintered diamond body comprises at least about 80 percent by volume diamond.

4. The method of claim 1, wherein the acid-forming compound is a fluoride salt.

5. The method of claim 4, wherein the acid-forming compound is ammonium bifluoride.

6. The method of claim 1, wherein the acid solution comprises nitric acid.

7. The method of claim 1, wherein the acid mixture comprises hydrofluoric acid and nitric acid.

8. The method of claim 1, wherein the soluble salts are disposed within the interstitial regions of the sintered diamond body.

9. The method of claim 1, wherein after the step of removing, further comprising:
cleaning the thermally stable diamond body to remove the soluble salts and/or insoluble oxides therefrom.

10. The method of claim 9, wherein the step of cleaning comprises placing the thermally stable diamond body into a volume of water that is at an elevated temperature and pressure.

11. The method of claim 9, wherein after the step of cleaning, further comprising:
reinfiltrating the thermally stable diamond body by filling at least a plurality of the interstitial regions of the thermally stable diamond body with an infiltrant material.

12. The method of claim 11, further comprising:
a second treating step, wherein the second treating step comprises:
removing the infiltrant material to a desired depth from a surface of the thermally stable diamond body.

13. The method of claim 12, wherein the depth is substantially uniform within the thermally stable diamond body at the center of the thermally stable diamond body compared to a position along a circumferential edge of the thermally stable diamond body.

14. The method of claim 1, wherein the metal material is a catalyst material.

15. The method of claim 1, wherein the metal material is an infiltrant material.

16. A method of making a thermally stable diamond construction comprising the steps of:
treating a sintered diamond body, wherein the sintered diamond body comprises:
a matrix phase of bonded together diamond grains;
a plurality of interstitial regions dispersed within the matrix; and
a catalyst material within the plurality of interstitial regions;
wherein the treating step comprises:
placing the sintered diamond body in a leaching agent; and
elevating the temperature of the sintered diamond body and the leaching agent to a desired leaching temperature for a predetermined amount of time;
wherein after the predetermined amount of time the sintered diamond body is a thermally stable diamond body and substantially free of the catalyst material;
reducing the temperature of the thermally stable diamond body and leaching agent in a controlled manner after the predetermined amount of time has passed, wherein during the step of reducing, the decrease in temperature is controlled to preferentially form soluble salts within the thermally stable diamond body; and
cleaning the thermally stable diamond body to remove any residual non-diamond materials remaining therein, and wherein the step of cleaning removes the soluble salts.

17. The method of claim 16, wherein the step of cleaning comprises subjecting the thermally stable diamond body to at least one process selected from the group consisting of ultrasonic energy, pressurization, electrolysis and gas-phase leaching.

18. The method of claim 17, wherein the step of cleaning comprises subjecting the thermally stable diamond body to ultrasonic in a bath of a solvent.

19. The method as recited in claim 16, wherein during the step of treating, further comprising elevating the pressure conditions of the sintered diamond body and the leaching agent to a desired pressure for a predetermined amount of time.

20. The method as recited in claim 16, wherein the leaching agent is prepared by combining an acid-forming solid compound with an acid solution.

21. The method of claim 16, wherein after the step of cleaning, further comprising:
   reinfiltrating the thermally stable diamond body by filling at least a plurality of the interstitial regions of the thermally stable diamond body with an infiltrant material.

22. The method of claim 21, further comprising:
   a second treating step, wherein the second treating step comprises:
   removing the infiltrant material to a desired depth from a surface of the thermally stable diamond body.

23. The method of claim 22, wherein the depth of the infiltrating material removal is substantially uniform within the thermally stable diamond body moving from a position at the center of the face of the thermally stable diamond body compared to a position along a circumferential edge of the thermally stable diamond body.

* * * * *